UNITED STATES PATENT OFFICE.

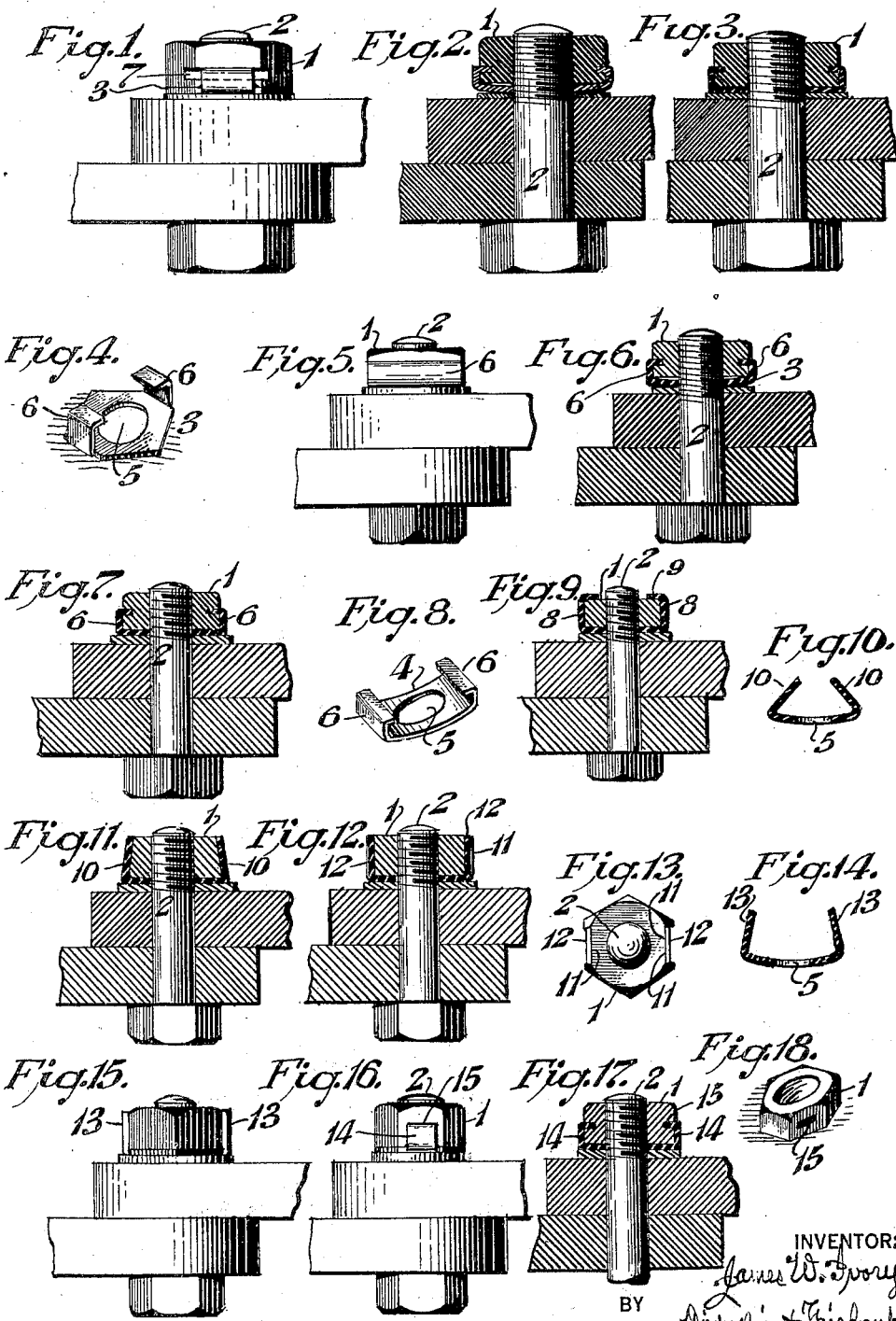

JAMES W. IVORY, OF PHILADELPHIA, PENNSYLVANIA.

NUT LOCK OR FASTENER.

1,398,325. Specification of Letters Patent. Patented Nov. 29, 1921.

Application filed December 30, 1920. Serial No. 433,985.

*To all whom it may concern:*

Be it known that I, JAMES W. IVORY, a subject of the King of Great Britain, residing in the city and county of Philadelphia, State of Pennsylvania, have invented a new and useful Nut Lock or Fastener, of which the following is a specification.

The object of my invention is to provide a nut with a bowed resilient washer which is attached thereto in such manner that the nut will carry the washer on and off of the threads of a bolt to which it is applied, and to exert pressure on said thread and those of the nut, thereby locking or fastening the nut in position and preventing unscrewing of the nut unless it is subjected to the superior force of a wrench or other suitable tool.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a nut lock embodying my invention.

Fig. 2 represents a diametrical section thereof, the washer plate being in normal condition.

Fig. 3 represents a similar section, the washer plate being in flattened condition practically locking or fastening the nut.

Fig. 4 represents a perspective view of the washer.

Fig. 5 represents a side elevation of another form of the device.

Fig. 6 represents a diametrical section thereof, showing the washer plate in normal condition.

Fig. 7 represents a diametrical section thereof showing the washer plate in tightened condition.

Fig. 8 represents a perspective view of another form of the washer plate.

Fig. 9 represents a diametrical view of another embodiment of the washer plate.

Fig. 10 represents a section of another embodiment of the washer plate.

Fig. 11 represents a diametrical section showing the washer plate Fig. 10 in position thereon.

Fig. 12 is a section of still another form.

Fig. 13 represents a top plan view thereof.

Fig. 14 represents a diametrical section of another embodiment of the invention.

Fig. 15 represents a diametrical section of the embodiment Fig. 14 in operative position.

Fig. 16 represents a side elevation of another embodiment of the invention.

Fig. 17 represents a diametrical section of the embodiment Fig. 16 in operative position.

Fig. 18 represents a perspective view of the nut shown in Figs. 16 and 17.

Similar numerals of reference indicate corresponding parts in the figures.

Referring to the drawings.

1 designates a nut, and 2 designates a bolt to which the same is applied for tightening purposes as usual in such cases.

3 designates a washer of resilient metal, the same being formed of a bowed plate 4 concave on its inner face, and convex on its outer face and having an opening 5 therein whereby it may pass over the threaded portion of the bolt and on the peripheral portion of the plate on opposite places thereon, the up-turned and inturned lips 6 which are thus of elbow form, said plate being of square, hexagonal, oblong, rounded or any other desired shape.

In opposite sides of the nut are the recesses 7 which extend inwardly toward the center of the nut and are adapted to receive said lips, thereby connecting the washer with the nut whereby the latter carries with it said washer, while being screwed on or off the bolt, it being seen that any form of nut may be used, whether square, conical, hexagonal, oblong, rounded or any other suitable shape. The washer 3 is concave on its inner face which is the side toward the inner face or back of the nut, and its outer face is convex which is on the side toward the object to be bolted.

When the nut is screwed on the bolt to full extent the plate 4 is flattened against the object to be bolted, and thus the washer exerts an even pressure on the threads of the bolt versus the threads in the nut, whereby the latter cannot revolve in reverse order or unscrew, and so it is held firmly locked or fastened in position until unscrewed by superior force as above stated when the washer will be carried with it from the bolt, the washer thus being released from the latter.

In Fig. 9, the sides 8 of the plate are extended therefrom so as to embrace the side of the nut and have their outer terminals the lips 9 inturned so as to overhang the top of the nut and rest thereon.

In Fig. 10, the sides 10 of the plate are inclined inwardly so as to spring against the side of a nut which is exteriorly of conical form, as shown in Fig. 11. In Figs. 12 and 13 the lips 11 of the plate are right angled and adapted to enter recesses 12 in the side of the nut and to be firmly held therein.

In Figs. 14 and 15, the sides 13 of the plate are primarily inclined inwardly and adapted to spring against the right angular sides of the nut.

In Figs. 16 and 17 I show inturned lips 14 narrower than those in Figs. 1, 2, 3 and 4, and the recesses 15 in the nut 18 are likewise narrow, as more plainly shown in Fig. 18 to accord with the width of said lips.

The thickness of the washer will be adjusted to accommodate it to various tensions required and to the size of the bolt and nut and the strain of its placement and the force to be applied thereto.

Having thus described my invention what I claim as new and desire to secure by Letters Patent, is:—

1. A nut lock consisting of a resilient washer plate of bowed form with an opening therein to be fitted over the threaded end of a bolt or the like, and a lip on the side of said plate having an inturned end, and a nut having in its side a recess in which said inturned end of said lip is seated and thereby connected.

2. In a nut lock, a resilient washer plate having an upturned resilient lip on the side thereof, said plate being concave on its inner face, and convex on its outer face, said concave inner face being adapted to engage resiliently with the back of the nut, and said convex outer face being adapted to engage resiliently with the object to be bolted, said lip being adapted to engage resiliently with the nut to join said nut and washer so they may be removed together from the bolt.

3. In a nut lock, a resilient washer plate having a resilient elbow shaped lip on the side thereof, and a nut having in its side intermediate of its outer and inner faces a recess which extends into the body of the nut toward the center thereof, a limb of said lip being adapted to resiliently engage the side of the nut, and the other limb being adapted to extend from said first named limb into said recess.

JAMES W. IVORY.

Witnesses:
   John A. Weidersheim,
   N. Bussinger.